(12) United States Patent
Pachaud et al.

(10) Patent No.: US 10,515,190 B2
(45) Date of Patent: Dec. 24, 2019

(54) SYSTEMS AND METHODS FOR CUSTOMIZING CONTENT

(71) Applicant: Facebook, Inc., Menlo Park, CA (US)

(72) Inventors: Eleanor Courtney Pachaud, Oakland, CA (US); Jessica Barone, Menlo Park, CA (US); Michael Baihua Midling, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/094,710

(22) Filed: Apr. 8, 2016

(65) Prior Publication Data

US 2017/0293744 A1 Oct. 12, 2017

(51) Int. Cl.
*G06F 21/62* (2013.01)
*G06F 21/10* (2013.01)
*H04L 29/08* (2006.01)
*H04L 29/06* (2006.01)
*G06Q 50/00* (2012.01)

(52) U.S. Cl.
CPC ............. *G06F 21/10* (2013.01); *G06Q 50/01* (2013.01); *H04L 63/10* (2013.01); *H04L 67/22* (2013.01)

(58) Field of Classification Search
CPC ... G06F 21/62; G06F 2221/2141; H04L 63/10
See application file for complete search history.

(56) References Cited

U.S. PATENT DOCUMENTS 9,065,836 B1 * 6/2015 Frank .................... H04L 63/104

\* cited by examiner

*Primary Examiner* — Izunna Okeke
(74) *Attorney, Agent, or Firm* — Sheppard Mullin Richter & Hampton LLP

(57) ABSTRACT

Systems, methods, and non-transitory computer-readable media can determine that a user operating a computing device has accessed a content item through the social networking system. A determination is made that the content item includes at least a first section of content and a second section of content, wherein the first section of content is restricted to users that are associated with a group of users, and wherein the second section of content is available to all users. A determination is made that the user is associated with the group of users. The content item is provided for presentation through a display screen of the computing device, wherein both the first section of content and the second section of content are presented to the user.

17 Claims, 8 Drawing Sheets

400

How do I add a Page to Business Manager?

Your Facebook account is associated with the employee role in Business Manager. The steps you'll see below may be different from what other people in your business see, depending on their role. Learn more about roles in Business Manager.

You must be an admin to add a Page in Business Manager. Employees are able to view Business Manager settings and be assigned to ad accounts, Pages and other business assets.

We suggest emailing your admin to request that they add your Page to Business Manager. You can find the contact info for your business admin by going to Business Manager > Business Info.

Note: If you are the Page owner, you may need to add your business admin to the Page so that he or she can claim it into Business Manager.

You'll get a notification in Business Manager when you've been added to the Page.

```
<!-- IS EMPLOYEE ONLY -->
<gk project="businessmanager_employee_only" exclude="false">
<rooster><ref id="1655562574712370"/></rooster>
<p>You must be an admin to add a Page in Business Manager.
Employees are able to view Business Manager settings and be
assigned to ad accounts, Pages and other business assets.
</p>

<p>We suggest emailing your admin to request that they add
your Page to Business Manager. You can find the contact info
for your business admin by going to <b>Business Manager</b>
<b><a
href="https://business.facebook.com/settings/info/">Business
Info</a></b>.</p>

<p>Note: If you are the Page owner, you may need to <a
href="/help/187316341316631">add your business admin to the
Page</a> so that he or she can claim it into Business
Manager.</p>

<p>You'll get a notification in Business Manager when
you've been added to the Page.</p>
</gk>
<!-- END EMPLOYEE SECTION -->
```

SYSTEMS AND METHODS FOR CUSTOMIZING CONTENT

FIELD OF THE INVENTION

The present technology relates to the field of content provision. More particularly, the present technology relates to techniques for customizing content for users.

BACKGROUND

Today, people often utilize computing devices (or systems) for a wide variety of purposes. Users can use their computing devices to, for example, interact with one another, access content, share content, and create content. Content items (e.g., web pages) are typically accessible through networks, e.g., the Internet. Such content items can be created, or formatted, using a computer markup language, e.g., HTML. Generally, such content items are able to be interpreted by software applications (e.g., web browsers) running on computing devices that are being operated by users. Once interpreted, the content items can be presented to the users through the respective display screens of the computing devices being operated by the users.

SUMMARY

Various embodiments of the present disclosure can include systems, methods, and non-transitory computer readable media configured to determine that a user operating a computing device has accessed a content item through the social networking system. A determination is made that the content item includes at least a first section of content and a second section of content, wherein the first section of content is restricted to users that are associated with a group of users, and wherein the second section of content is available to all users. A determination is made that the user is associated with the group of users. The content item is provided for presentation through a display screen of the computing device, wherein both the first section of content and the second section of content are presented to the user.

In an embodiment, the systems, methods, and non-transitory computer readable media are configured to determine that a second user operating a computing device has accessed the same content item through the social networking system, determine that the second user is not associated with the group of users, and provide the content item for presentation through a display screen of the computing device of the second user, wherein only the second section of content is presented to the second user.

In an embodiment, the systems, methods, and non-transitory computer readable media are configured to determine that the user has a particular business role.

In an embodiment, the systems, methods, and non-transitory computer readable media are configured to determine that the user has a particular set of access privileges.

In an embodiment, the systems, methods, and non-transitory computer readable media are configured to determine that the user has performed at least one pre-defined action.

In an embodiment, the systems, methods, and non-transitory computer readable media are configured to determine that the user has not performed at least one pre-defined action.

In an embodiment, the systems, methods, and non-transitory computer readable media are configured to determine that the user has been associated with at least one particular attribute for a threshold period of time.

In an embodiment, the systems, methods, and non-transitory computer readable media are configured to determine that markup language code used to create the content item identifies the first section of content and the second section of content.

In an embodiment, the first section of content that is restricted to users associated with the group of users is identified using at least one tag that references the group of users.

In an embodiment, the systems, methods, and non-transitory computer readable media are configured to determine that the user has subsequently accessed the same content item through the social networking system, determine that the user is no longer associated with the group of users, and provide the content item for presentation through a display screen of the computing device of the user, wherein only the second section of content is presented to the user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 4A illustrates an example content item that has been customized for a group of users, according to various embodiments of the present disclosure.

FIG. 4B illustrates an example of markup language code for customizing content for a group of users, according to various embodiments of the present disclosure.

Figure 1:
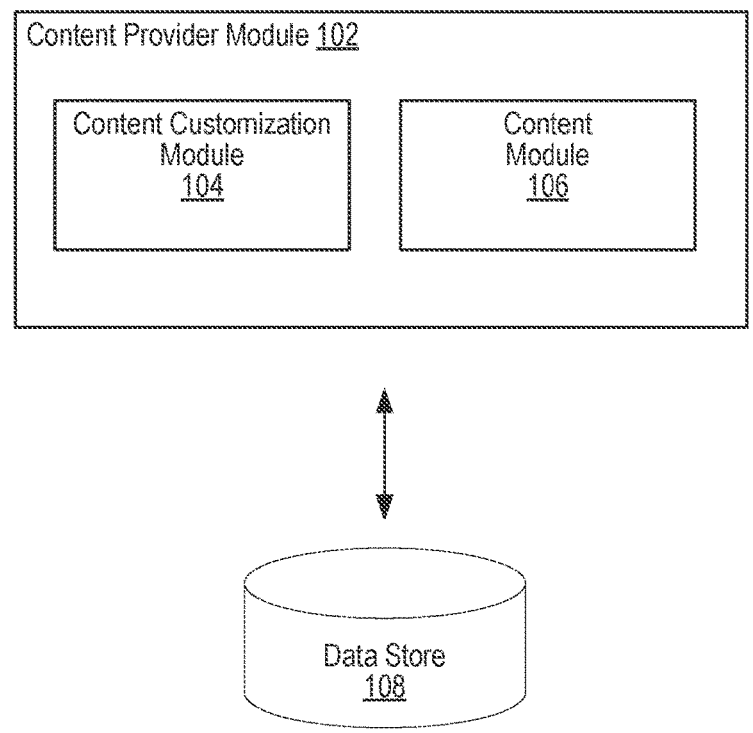
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Customizing Content

Today, people often utilize computing devices (or systems) for a wide variety of purposes. Users can use their computing devices to, for example, interact with one another, access content, share content, and create content. Content items (e.g., web pages) are typically accessible through networks, e.g., the Internet. Such content items can be created, or formatted, using a computer markup language, e.g., HTML. Generally, such content items are able to be interpreted by software applications (e.g., web browsers) running on computing devices and, once interpreted, the content items can be presented through the respective display screens of the computing devices that are being operated by users. Under conventional approaches, each user that accesses a particular content item (e.g., web page) using, for example, the same Uniform Resource Locator (URL), will typically see the same content. In other words, the content presented to a user typically does not change based on the user. Displaying different content to users, for example, based on the respective attributes of the users may be useful in a number of scenarios. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, a content item can be created so that different sections of the content item can be shown to users that access the content item, for example, based on the user's identity and/or the user's defining attributes (e.g., job title, business role, skill level, operations performed by the user in the past, etc.). For example, in some embodiments, when creating the content item, one or more sections of content included in the content item can be tailored to a set, or group, of users that share one or more attributes. The sections can be restricted so that only users included in that set of users are presented the tailored content. In one example, displaying different sections of help content to users based on attributes, such as their skill level or business role (e.g., administrator versus employee), can allow for users to view relevant content in a timely and efficient manner.

FIG. 1 illustrates an example system 100 including an example content provider module 102, according to an embodiment of the present disclosure. As shown in the example of FIG. 1, the content provider module 102 can include a content customization module 104 and a content module 106. In some instances, the example system 100 can include at least one data store 108. The components (e.g., modules, elements, etc.) shown in this figure and all figures herein are examples only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 610 of FIG. 6. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6.

The content provider module 102 can be configured to communicate and/or operate with the at least one data store 108, as shown in the example system 100. The at least one data store 108 can be configured to store and maintain various types of meeting data. For example, the data store 108 can store information describing content items that were created and made available to users. Some of the stored content items can include sections that have been restricted to a specified set of users. In some embodiments, such restricted content can be designated in the content item using special tags that correspond to a computer markup language that was used to create the content item. In some implementations, the at least one data store 108 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data.

The content customization module 104 is configured to allow various portions, or sections, of content items to be restricted to different sets, or groups, of users. More details regarding the content customization module 104 will be provided below with reference to FIG. 2.

The content module 106 is configured to render content items that are accessed by users of a social networking system. When rendering content items, the content module 106 can determine whether the user accessing the content item corresponds to one or more pre-defined sets, or groups, of users. The content module 106 can then render the content item based on the groups of users to which the user corresponds. More details regarding the content module 106 will be provided below with reference to FIG. 3.

Figure 2:
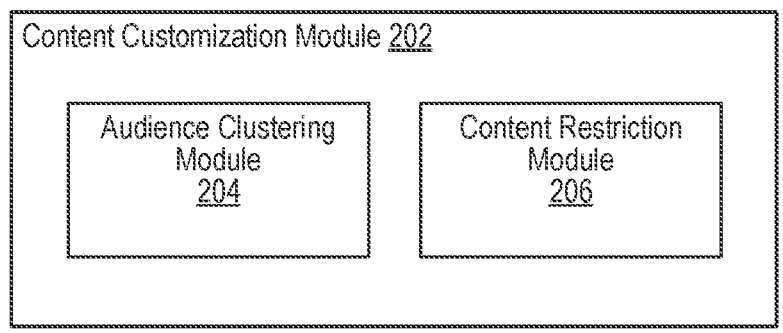
FIG. 2 illustrates an example of a content customization module, according to an embodiment of the present disclosure.

FIG. 2 illustrates an example of a content customization module 202, according to an embodiment of the present disclosure. In some embodiments, the content customization module 104 of FIG. 1 can be implemented as the content customization module 202. As shown in FIG. 2, the content customization module 202 can include an audience clustering module 204 and a content restriction module 206.

Figure 6:
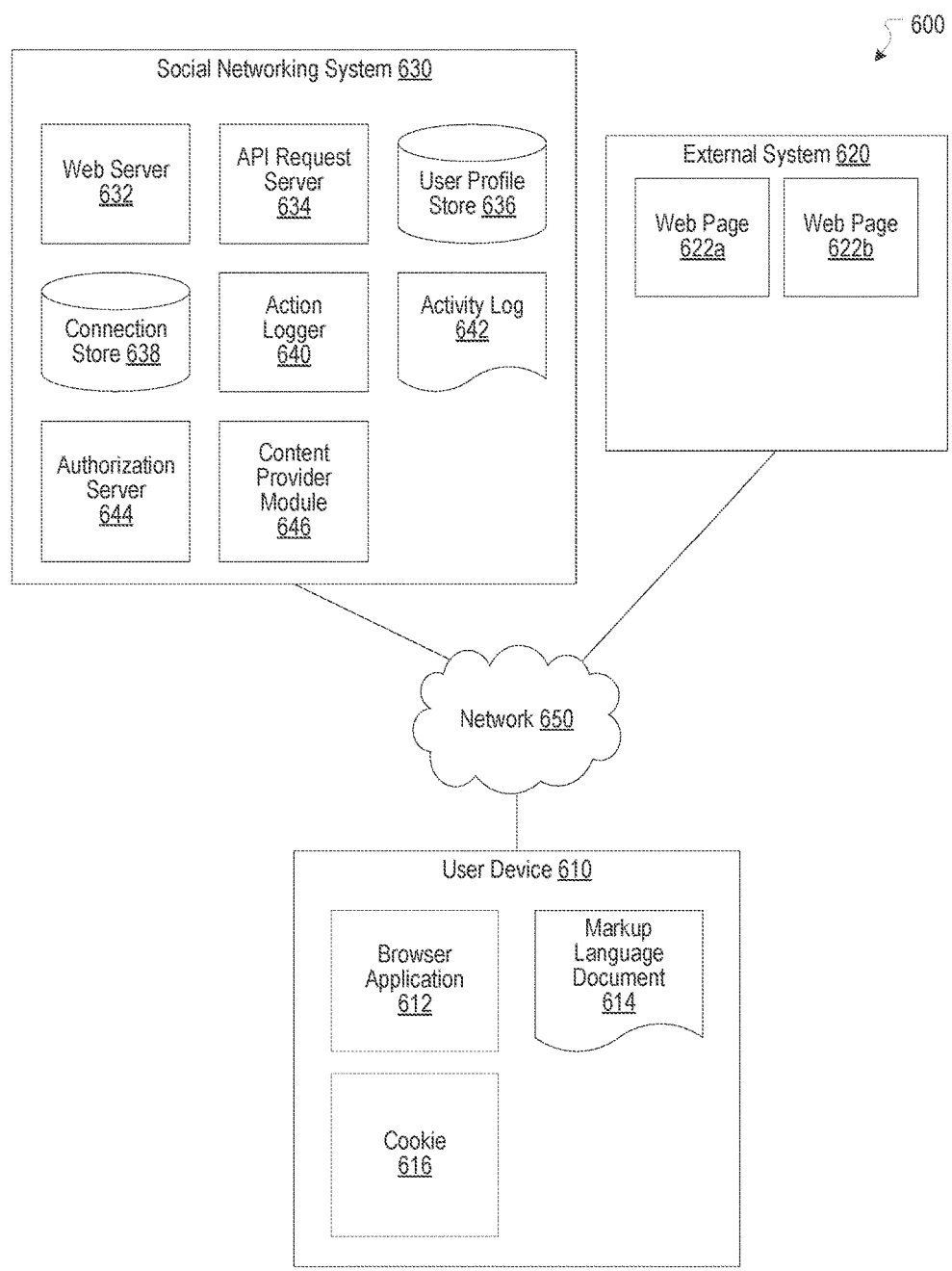
FIG. 6 illustrates a network diagram of an example system including an example social networking system that can be utilized in various scenarios, according to an embodiment of the present disclosure.

In general, users can create content items through a social networking system (e.g., the social networking system 630 of FIG. 6). In some instances, content items may be created using a computer markup language (e.g., HTML or some variant). When creating content items, a user can use various tags associated with the computer markup language to format the content item, for example, to define the appearance of the content item when presented to users. One example of a content item can be a help page that is directed to a particular topic (e.g., "How do I create a new advertisement campaign?"). Users of the social networking system can interact with the social networking system to navigate to the help page to learn more about the topic.

In some instances, a content item may include content that is relevant to a number of different users. However, the same content item may also include portions of content that are applicable only to a certain group of users. For example, a help page directed to a particular topic may include different sections of content that apply to different users and/or different groups of users. In this example, one section of the help page may be relevant to users that have administrative privileges while a different section of the help page may be relevant to users that have general employee privileges. In another example, a content item may be relevant to users that have administrative privileges but the content creator may want to include a section that is to be shown to users that do not have administrative privileges. In such instances, rather than creating separate help pages that target the different groups of users (e.g., administrators versus employees), in various embodiments, the content customization module 202 can be used to customize, or restrict, sections of content included in content items to certain groups of users. In other words, the section of the help page that is relevant to users that have administrative privileges can be restricted so that only users that have administrator privileges are shown that section when accessing the help page. Similarly, the section of the help page that is relevant to users that have employee privileges can be restricted so that users having only employee access are shown that section when accessing the help page.

When restricting one or more sections of content, the audience clustering module 204 can be utilized to specify, or define, a user or group of users to which the sections of content are to be shown. In some embodiments, the audience clustering module 204 can be used to define a group of users by specifying one or more attributes that need to be possessed by a user before the user is shown the restricted section of content. Such attributes may correspond, for example, to the user's job title, business role, skill level, access privileges, to name some examples. Other dimensions are possible. For example, other attributes can include age range, gender, and various other demographics. In some embodiments, such attributes may be based on actions that a user has taken including, for example, one or more operations that were, or were not, performed by the user. Some examples of action-based operations include accessing certain content, performing a task, or failing to perform a task. Another type of attribute can correspond to a duration of time that a user has been associated with a particular attribute. For example, a section of content may be restricted to users that have had administrative privileges for at least six months.

Once an audience, or group of users, for one or more sections in the content item is defined, the content restriction module 206 can be utilized to configure the content item so that presentation of the one or more sections is restricted to the group of users. In other words, when the content item is accessed by a user, the presentation, or rendering, of the one or more restricted sections will depend on whether the user is in the group of users that are authorized to access the restricted sections. In some embodiments, the one or more sections are restricted by associating the restricted sections with the group of users that are authorized to view the sections. In one example, such association may be performed by embedding, or including, one or more tags in the content item that reference the authorized group of users with respect to the restricted content. As mentioned, in some instances, content items can be created using a computer markup language. In such instances, a <gk> tag can be used to restrict a portion of content in the content item as follows:

```
<gk project="administrators_only">
<p>As an administrator, you are permitted to make
changes to this Page through the Page interface.
</p>
</gk>
<gk project="employees_only">
<p>You must be an administrator to make changes to this Page.
We suggest emailing your administrator to request access.
</p>
</gk>
```

In the example above, the tag <gk project="administrators_only"> is used to restrict content to a group of users that are referenced by the "administrators_only" group name (e.g., users having administrator privileges). Any content included within the first closing tag </gk> is thus restricted to users that are in the "administrators_only" group. Further, the tag <gk project="employees_only"> is used to restrict content to a group of users that are referenced by the "employees_only" group name (e.g., users having only employee privileges). Any content included within the second closing tag </gk> is thus restricted to users that are in the "employees_only" group.

Figure 3:
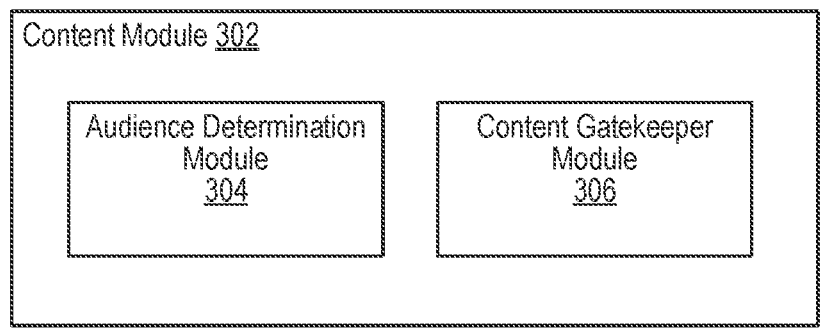
FIG. 3 illustrates an example of a content module, according to an embodiment of the present disclosure.

FIG. 3 illustrates an example of a content module 302, according to an embodiment of the present disclosure. In some embodiments, the content module 106 of FIG. 1 can be implemented as the content module 302. As shown in FIG. 3, the content module 302 can include an audience determination module 304 and a content gatekeeper module 306.

The content module 302 can be configured to render content items that are accessed by users of the social networking system. A content item can be rendered, for example, by parsing and/or interpreting any computer markup language code that was used to create the content item and presenting the content item through a display screen of a computing device that was used to access the content item. Various features of the content module 302 may be implemented by the social networking system (e.g., the social networking system 630 of FIG. 6), a computing device (e.g., the user device 610 of FIG. 6) being used to interact with the social networking system, or both.

In various embodiments, when a user operating a computing device accesses a content item through the social networking system, the audience determination module 304 is utilized to determine any attributes associated with the user and/or whether the user is associated with any pre-defined groups of users. In various embodiments, the attributes of a user can be determined from a social graph that is managed by the social networking system. For example, a user accessing a content item may be an administrator of a page "Soda Pop" that is accessible through the social networking system. In this example, the audience determination module 304 can determine that the user has administrative privileges for the page "Soda Pop". The content gatekeeper module 306 can be configured to parse the content item being accessed to determine whether the content item includes any portions, or sections, of content that are restricted to certain users and/or groups of users. If the content item includes restricted content, the content gatekeeper module 306 can determine the sections of content that the user should, or should not, be shown based on the user's attributes and/or groups with which the user is associated. For example, the content item may include a first section of content that is restricted to administrators of the page "Soda Pop" and a second section of content that is restricted to non-administrators of the page "Soda Pop". In this example, since the user has administrative privileges for the page "Soda Pop", the content gatekeeper module 306 can cause the first section of content to be rendered and the second section of content to not be rendered for the user.

FIG. 4A illustrates an example content item 400 that has been customized for a group of users, according to various embodiments of the present disclosure. In the example of FIG. 4A, the example content item 400 includes a section of content 402. In this example, the section of content 402 is configured to be restricted to users that do not have the administrative privileges needed to add a page, e.g., users associated with an employee role. In various embodiments, when a user accesses the content item 400 through the social networking system, a determination is made as to whether the user satisfies any attributes, or constraints, that are associated with the section of content 402. In other words, a determination is made whether the user has the administrative privileges that are needed to add a page. If the user has the administrative privileges, the section of content 402 is not rendered and, therefore, not presented to the user. In contrast, if the user does not have the administrative privileges, the section of content 402 is rendered and, therefore, is presented to the user.

FIG. 4B illustrates an example 450 of markup language code 452 for customizing content for a group of users, according to various embodiments of the present disclosure. In this example, the markup language code 452 was used to create the content item 400 of FIG. 4A. As shown in the example markup language code 452, in some embodiments, restricted sections of a content item can be identified using tags 454, 456 (e.g., <gk> and </gk>). In the example of FIG. 4B, access to the section of content is restricted to the group referenced by the name "businessmanager_employee_only". In various embodiments, the social networking system can manage data describing the respective associations between users and the groups, or group names, with which those users are associated. In FIG. 4B, any content included between the opening <gk> tag 454 and the closing </gk> tag 456 is designated as being restricted to users that correspond to the group referenced by the name "businessmanager_employee_only".

Figure 5:
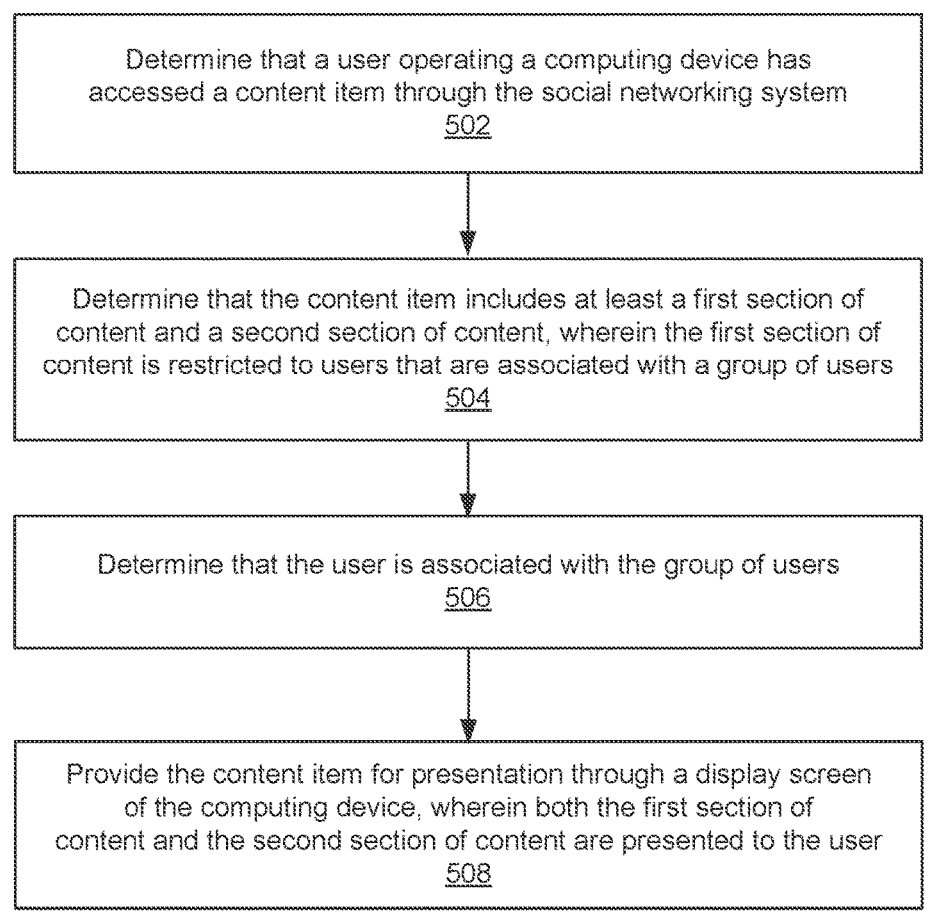
FIG. 5 illustrates an example process for customizing content, according to various embodiments of the present disclosure.

FIG. 5 illustrates an example process 500 for customizing content. It should be appreciated that there can be additional, fewer, or alternative steps performed in similar or alternative orders, or in parallel, within the scope of the various embodiments discussed herein unless otherwise stated. At block 502, a determination is made that a user operating a computing device has accessed a content item through the social networking system. At block 504, a determination is made that the content item includes at least a first section of content and a second section of content, wherein the first section of content is restricted to users that are associated with a group of users, and wherein the second section of content is available to all users. At block 506, a determination is made that the user is associated with the group of users. At block 508, the content item is provided for presentation through a display screen of the computing device, wherein both the first section of content and the second section of content are presented to the user.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider 646 can, for example, be implemented as the content provider module 102 of FIG. 1. As discussed previously, it should be appreciated that there can be many variations or other possibilities.

Hardware Implementation

Figure 7:
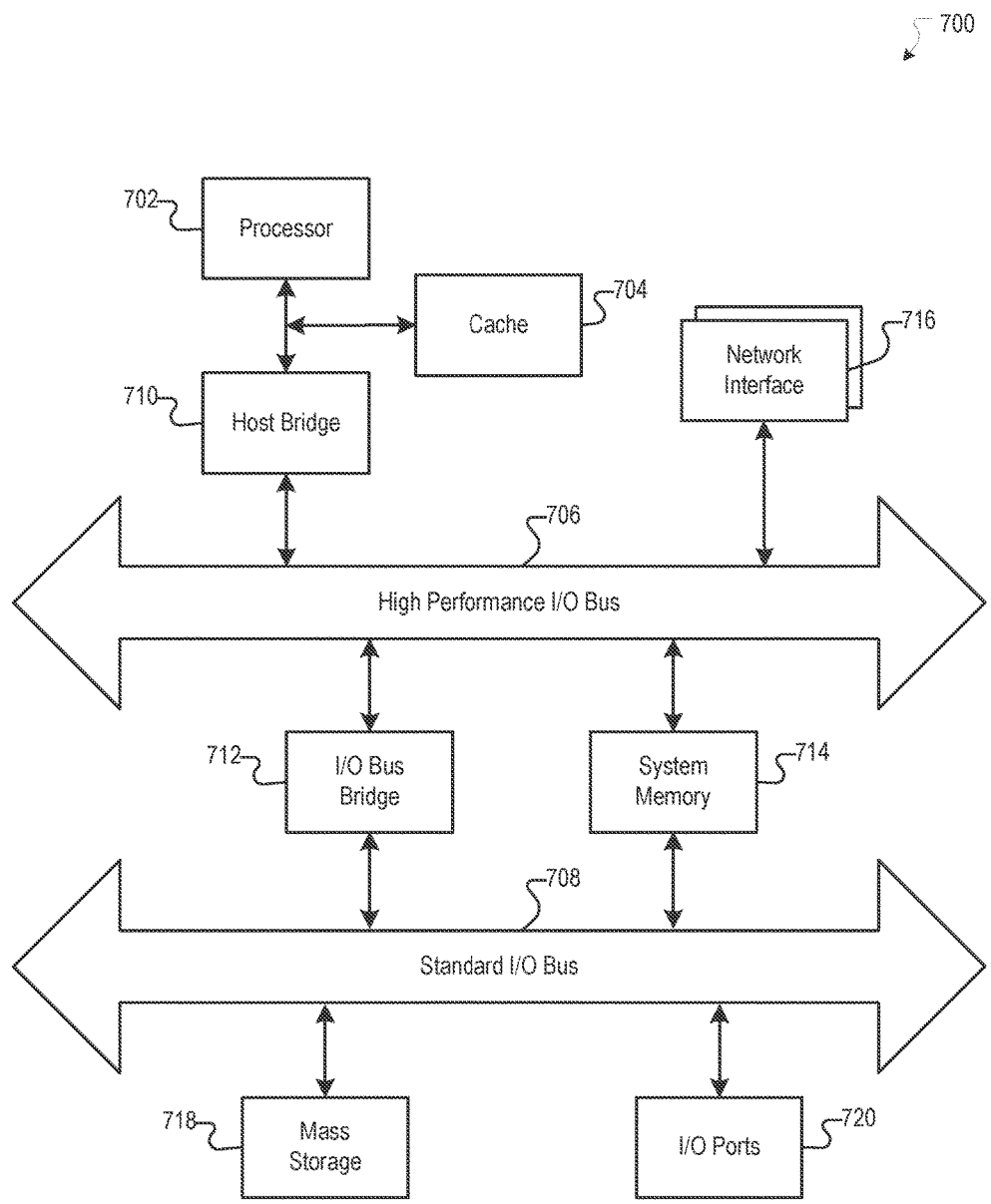
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a social networking system, that a user operating a computing device has accessed a content item through the social networking system;
   determining, by the social networking system, that the content item includes at least a first section of content and a second section of content, wherein the first section of content is restricted to users associated with a group of users, the determining further comprising:
      determining, by the social networking system, that markup language code used to create the content item identifies the first section of content and the second section of content, wherein the first section of content that is restricted to users associated with the group of users is identified using at least one tag that references the group of users;
   determining, by the social networking system, that the user is associated with the group of users; and
   providing, by the social networking system, the content item for presentation through a display screen of the computing device, wherein both the first section of content and the second section of content are presented to the user.

2. The computer-implemented method of claim 1, the method further comprising:
   determining, by the social networking system, that a second user operating a computing device has accessed the same content item through the social networking system;
   determining, by the social networking system, that the second user is not associated with the group of users; and
   providing, by the social networking system, the content item for presentation through a display screen of the computing device of the second user, wherein only the second section of content is presented to the second user.

3. The computer-implemented method of claim 1, wherein determining that the user is associated with the group of users further comprises:
   determining, by the social networking system, that the user has a particular business role.

4. The computer-implemented method of claim 1, wherein determining that the user is associated with the group of users further comprises:
   determining, by the social networking system, that the user has a particular set of access privileges.

5. The computer-implemented method of claim 1, wherein determining that the user is associated with the group of users further comprises:
   determining, by the social networking system, that the user has performed at least one pre-defined action.

6. The computer-implemented method of claim 1, wherein determining that the user is associated with the group of users further comprises:
   determining, by the social networking system, that the user has not performed at least one pre-defined action.

7. The computer-implemented method of claim 1, the method further comprising:
   determining, by the social networking system, that the user has subsequently accessed the same content item through the social networking system;

determining, by the social networking system, that the user is no longer associated with the group of users; and providing, by the social networking system, the content item for presentation through a display screen of the computing device of the user, wherein only the second section of content is presented to the user.

8. A system comprising:

at least one processor; and a memory storing instructions that, when executed by the at least one processor, cause the system to perform:

determining that a user operating a computing device has accessed a content item through the social networking system;

determining that the content item includes at least a first section of content and a second section of content, wherein the first section of content is restricted to users associated with a group of users, the determining further comprising:

determining that markup language code used to create the content item identifies the first section of content and the second section of content, wherein the first section of content that is restricted to users associated with the group of users is identified using at least one tag that references the group of users;

determining that the user is associated with the group of users; and providing the content item for presentation through a display screen of the computing device, wherein both the first section of content and the second section of content are presented to the user.

9. The system of claim 8, wherein the system further performs:

determining that a second user operating a computing device has accessed the same content item through the social networking system;

determining that the second user is not associated with the group of users; and providing the content item for presentation through a display screen of the computing device of the second user, wherein only the second section of content is presented to the second user.

10. The system of claim 8, wherein determining that the user is associated with the group of users further causes the system perform:

determining that the user has a particular business role.

11. The system of claim 8, wherein determining that the user is associated with the group of users further causes the system perform:

determining that the user has a particular set of access privileges.

12. The system of claim 8, wherein determining that the user is associated with the group of users further causes the system perform:

determining that the user has performed at least one pre-defined action.

13. A non-transitory computer-readable storage medium including instructions that, when executed by at least one processor of a computing system, cause the computing system to perform a method comprising:

determining that a user operating a computing device has accessed a content item through the social networking system;

determining that the content item includes at least a first section of content and a second section of content, wherein the first section of content is restricted to users associated with a group of users, the determining further comprising:

determining that markup language code used to create the content item identifies the first section of content and the second section of content, wherein the first section of content that is restricted to users associated with the group of users is identified using at least one tag that references the group of users;

determining that the user is associated with the group of users; and providing the content item for presentation through a display screen of the computing device, wherein both the first section of content and the second section of content are presented to the user.

14. The non-transitory computer-readable storage medium of claim 13, wherein the computing system further performs:

determining that a second user operating a computing device has accessed the same content item through the social networking system;

determining that the second user is not associated with the group of users; and providing the content item for presentation through a display screen of the computing device of the second user, wherein only the second section of content is presented to the second user.

15. The non-transitory computer-readable storage medium of claim 13, wherein determining that the user is associated with the group of users further causes the computing system perform:

determining that the user has a particular business role.

16. The non-transitory computer-readable storage medium of claim 13, wherein determining that the user is associated with the group of users further causes the computing system perform:

determining that the user has a particular set of access privileges.

17. The non-transitory computer-readable storage medium of claim 13, wherein determining that the user is associated with the group of users further causes the computing system perform:

determining that the user has performed at least one pre-defined action.

* * * * *